United States Patent [19]

Shiber

[11] 3,748,928

[45] July 31, 1973

[54] CONTROL SYSTEM FOR MUTIPLE DRIVING AXLE VEHICLE

[75] Inventor: Samuel Shiber, Chicago, Ill.

[73] Assignee: Borg-Warner Corporation, Chicago, Ill.

[22] Filed: Sept. 20, 1971

[21] Appl. No.: 181,928

[52] U.S. Cl. .................................................. 74/711
[51] Int. Cl. .............................................. F16h 1/44
[58] Field of Search ................. 180/44; 74/714, 711

[56] References Cited
UNITED STATES PATENTS

| | | | |
|---|---|---|---|
| 3,191,708 | 6/1965 | Simonds et al. | 180/44 R |
| 3,557,634 | 1/1971 | Bixby | 74/714 X |
| 3,517,573 | 6/1970 | Roper | 74/711 |

Primary Examiner—McKeon Arthur I.
Attorney—Donald W. Banner, Robert L. Zieg et al.

[57] ABSTRACT

In multiple driving axle vehicles, such as four wheel drive automotive vehicles, drive is transmitted to front and rear differentials respectively drivingly connected to front and rear pairs of road wheels, a controlled third or center differential drivingly connected to the front and rear differentials and acting as a free differential until one output of this differential rotates slower or faster a predetermined amount than the other output, at which time the control acts to operate a clutch to lock the center differential preventing any further increase in speed differences. The control is sensitive to the speed differences, percentagewise, of the outputs of the front and rear differentials, and acts to bias torque in the third differential according to the derivative of their speeds.

22 Claims, 11 Drawing Figures

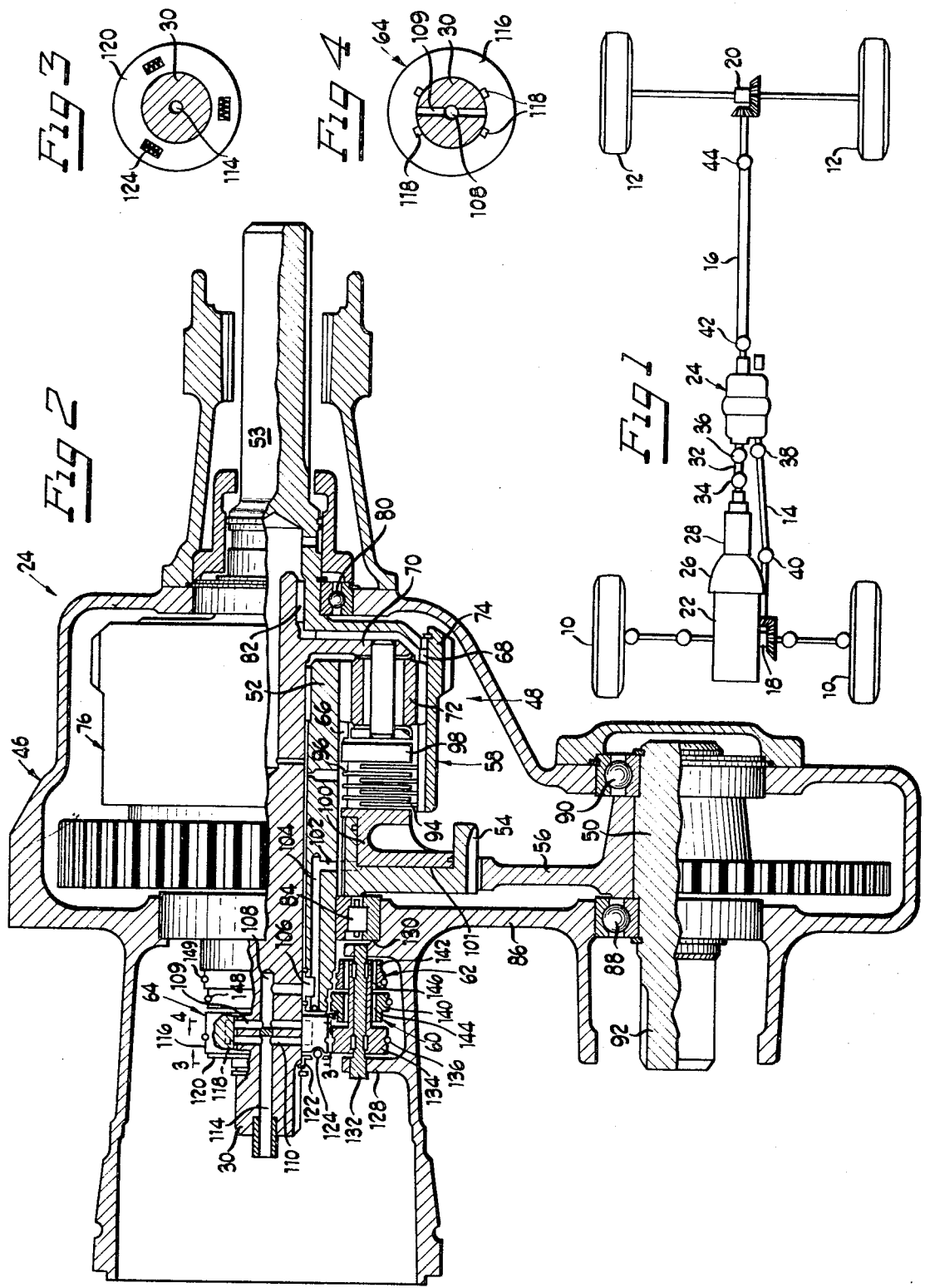

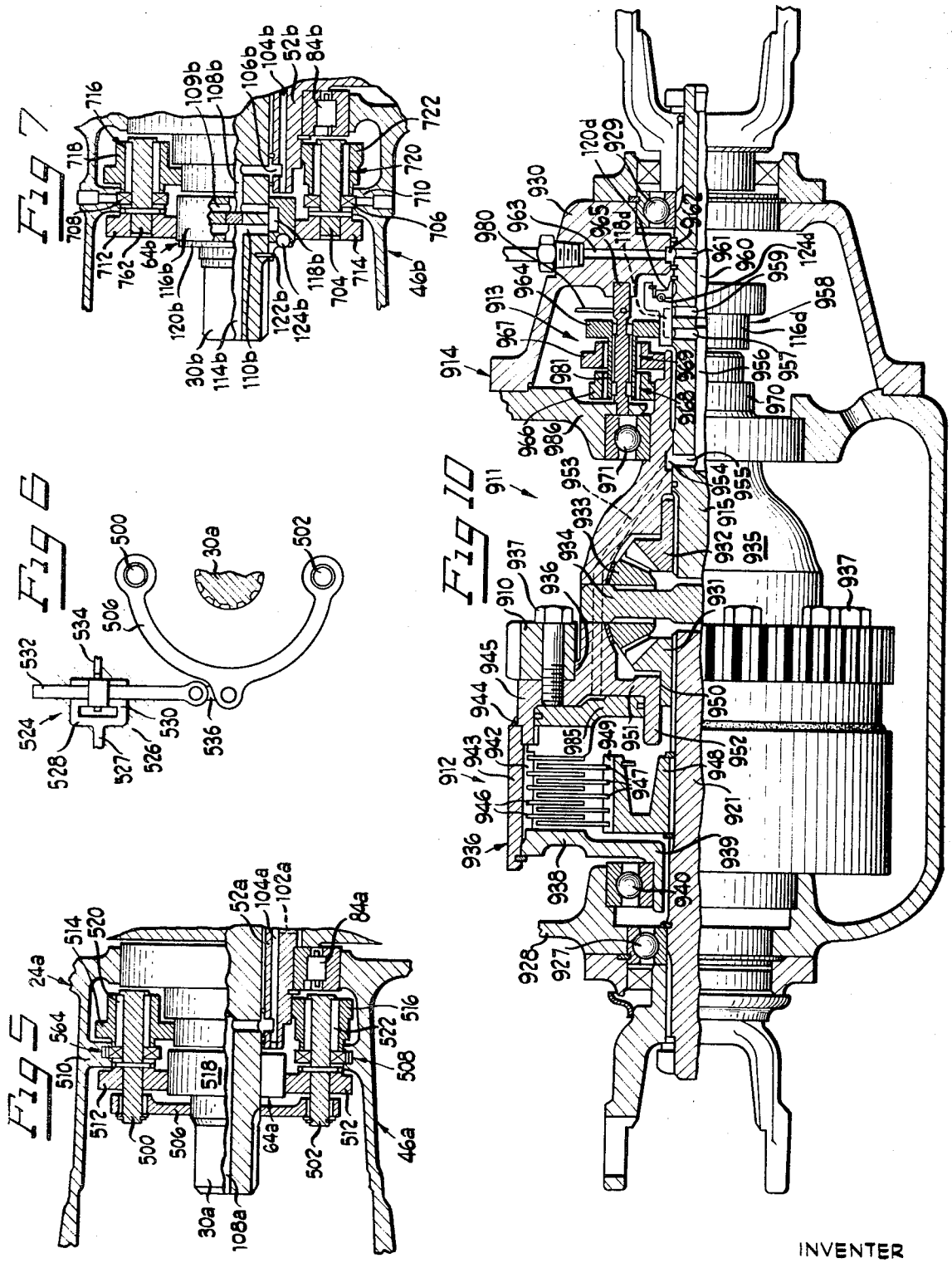

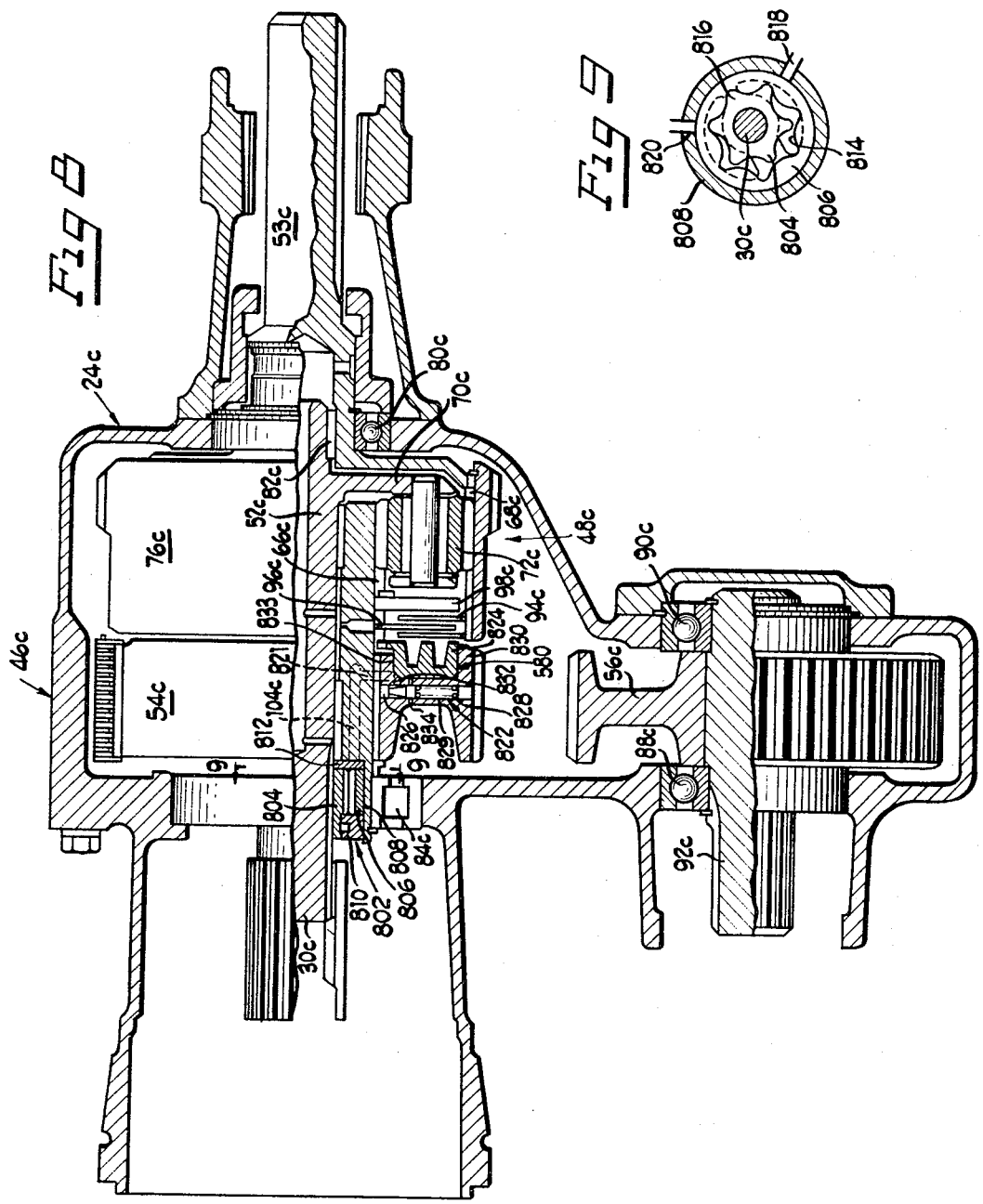

Patented July 31, 1973  3,748,928

INVENTOR
SAMUEL SHIBER
BY Dennis McWilliams
ATTORNEY

CONTROL SYSTEM FOR MUTIPLE DRIVING AXLE VEHICLE

BACKGROUND AND SUMMARY OF THE INVENTION

This invention relates to multiple driving axle vehicles, such as four wheel drive automotive vehicles, and more particularly to control systems for positively limiting the differential action of differential gearing of such vehicles to predetermined limits.

It is well known that four wheel drive automotive vehicles conventionally employ front and rear driving axles having front and rear differentials respectively drivingly connected to front and rear pairs of road wheels through a third or controlled differential powered by the engine. Such controlled differential functions to prevent or hinder spinning of one driving axle relative to the other dirving axle. In U.S. Pat. No. 2,796,941, a control, proposed for providing this function, is automatically operative and is adapted for use with a center differential having a planet carrier driven by the engine and having first and second sun gears, gears respectively connecting the first and second sun gears to the front and rear drive shafts with speed change ratios such that the second sun gear rotates a predetermined percentage faster than the planet carrier when the front and rear pairs of wheels are driven at the same angular speed, with a first two-way overrunning clutch connected between the front wheel and rear wheel drive shafts to lock them upon overspeeding of the rear drive shaft relative to the front drive shaft resulting in a positive drive to the front wheels through the first clutch, and a second two-way overrunning clutch connected between the planet carrier and the second sun gear to lock them upon overspeeding of the planet carrier and front wheels relative to the second sun gear and rear wheels providing a positive drive to the rear wheels through the second clutch. In this control, different and alternate drive paths between the front wheels and rear wheels are provided by the respective one-way clutches, which are instrumental in transmitting torque between the drive and driven shafts, dependent on overspeeding one or the other of the shafts. It will be apparent such control is automatically operative dependent on and sensitive only to the nominal speed ratio between the two differential outputs.

The present invention is directed to, and has for its principal object, an improved control system for the third or center differential of a four wheel drive automotive vehicle and which control system is characterized by being sensitive to the speed ratio, percentagewise, of the rotary speed of an input shaft and two output shafts and, upon sensing more than a predetermined speed difference between any two shafts, to bias torque across the third differential.

Another object of the invention is to provide an improved control system for a differential having three interconnected shafts and including means responsive to the speed differences of two shafts and effective to divide their speeds to provide a speed ratio generating a signal for activating torque-biasing means operative to limit the speed ratio of the two shafts below or above a predetermined value.

Another object of the invention is to provide a control system for a differential having an input shaft and two output shafts, and including means energizable to bias torque across the third differential and means sensing the rotary speeds of the shafts and operative to energize the torque biasing means upon sensing more than a predetermined speed difference between any two shafts.

Another object of the invention is to provide an improved control system for a differential having an input shaft and two output shafts, a hydraulic clutch operable to bias torque between the shafts for conjoint rotation, a valve actuatable to supply fluid pressure to the clutch, and means sensing the rotary speeds of the shafts and operative, upon speed differences between the output shafts, to actuate the valve.

Additional objects and advantages will be apparent from the following detailed description taken in conjunction with the drawings.

DESCRIPTION OF THE DRAWINGS

FIG. 1 is a diagrammetric top plan view of a four wheel drive motor vehicle and embodying a controlled center differential of the present invention;

FIG. 2 is an enlarged, partial sectional view of the differential shown in FIG. 1;

FIG. 3 is a transverse fragmental sectional view taken on line 3—3 of FIG. 2;

FIG. 4 is a transverse fragmental sectional view taken on line 4—4 of FIG. 2;

FIG. 5 is an enlarged partial sectional fragmentary view illustrating a first modified embodiment of the differential control shown in FIG. 2;

FIG. 6 is a fragmentary partial view of the pressure fluid supply valve for the hydraulic clutch of the differential control embodiment of FIG. 5;

FIG. 7 is an enlarged partial sectional fragmentary view illustrating a second modified embodiment of the differential control shown in FIG. 2;

FIG. 8 is a view similar to FIG. 2 and showing a third modified embodiment of the invention;

FIG. 9 is a vertical sectional view taken on line 9—9 of FIG. 8;

FIG. 10 is a view similar to FIG. 2 but illustrating a fourth modified embodiment;

DESCRIPTION OF EMBODIMENT OF THE INVENTION OF FIGS. 1, 2, 3 AND 4

Figure 11:
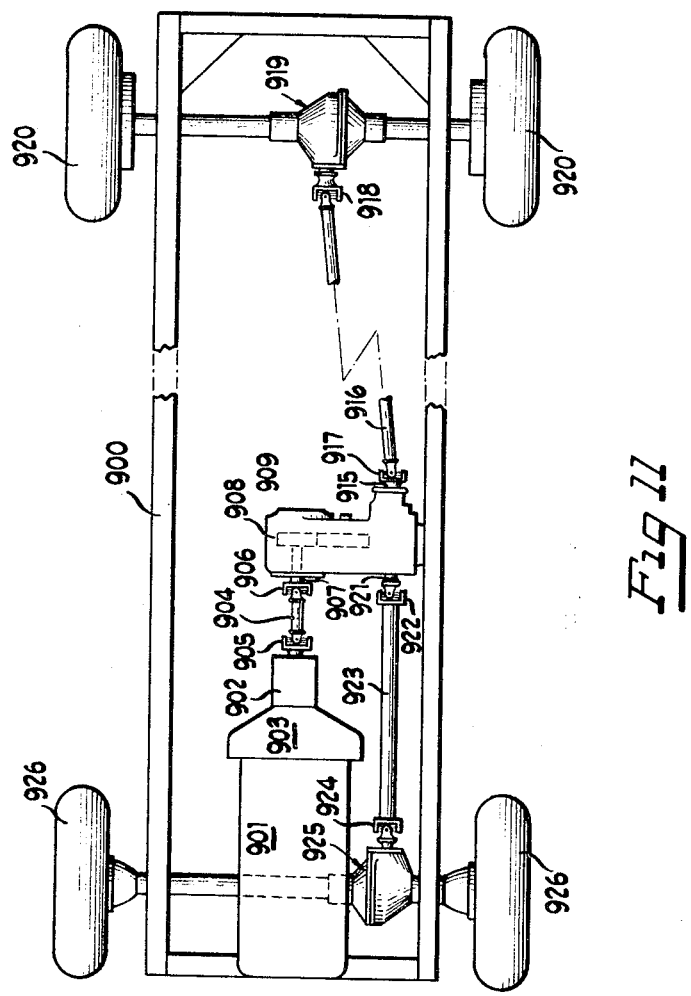
FIG. 11 is a schematic plan view of a four wheel drive vehicle embodying the differential and control system therefor shown in FIG. 10.

Referring to FIG. 1 of the drawings, there is shown a four wheel drive automotive vehicle having front and rear pairs of road wheels 10 and 12, respectively, first and second drive shafts in the form of front and rear propeller shafts 14 and 16, respectively, front and rear differentials 18 and 20, respectively, an engine 22, and transmission means provided by a center or third differential and drive transfer unit 24 providing a driving connection between the engine 22 and the front and rear propeller shafts 14 and 16. A disengageable friction clutch 26 and a change-speed gear box 28 are drivingly interposed between the engine 22 and the unit 24, the gearbox output being connected to an input or first transmission shaft 30 (see FIG. 2) in the unit 24 by a relatively short connecting shaft 32, having universal joints 34 and 36 represented diagrammatically in FIG. 1. The front and rear propeller shafts 14 and 16 incorporate universal joints 38, 40, 42, 44 respectively.

With the exception of the center differential and drive transfer unit 24, the purpose and operation of the other parts of the vehicle which are mentioned above are well known and the following description and operation of the unit 24 is made with reference mainly to FIGS. 2, 3, and 4.

The components of the unit 24 are housed in a separate casing 46 and comprise, generally, a center differential gear set 48, the first transmission input shaft 30, a second transmission or output shaft 50, a third transmission sleeve shaft 52, a fourth transmission shaft 53, drive transfer means 54 and 56, a fluid-actuated device in the form of an hydraulically operated friction clutch 58, operative to bias torque between two of said shafts and control means sensing speed ratio between two of said shafts for activating the clutch in response to said speed ratio being in excess of a predetermined value and including overrunning clutch devices 60 and 62, and a valve 64 controlling pressure fluid to clutch 58.

The center differential comprises a planetary gear set 48 having three elements, namely, a sun gear 66, an annulus or ring gear 68, and a planet carrier 70 carrying planet gears 72, only one of which is shown in FIG. 2. Each planet gear 72 meshes with the sun and ring gears 66 and 68. The gear teeth of the ring gear 68 are formed internally on the inner surface of a cylindrical portion 74 of a cup-shaped member 76 which has an integrally formed stem portion providing the transmission shaft 53 and a part of which is rotatably supported in the casing 46 by a bearing 80. The stem portion or transmission shaft 53 is spline-connected to the universal joint 42 and is thus drivingly connected to the rear pair of road wheels 12,12 by the propeller shaft 16, universal joint 44 and rear differential 20.

The transmission shaft 30 is positioned coaxially with the center differential gear set 48 and is rotatably supported in and by the transmission sleeve shaft 52, the rear end of shaft 30 extending into and being rotatable on a bearing 82 located in a bore in the stem portion 74 of cup-shaped member 76. The planet carrier 70 is formed integral with and extends radially outward of the shaft 30 between the end of sleeve shaft 52 and the cup-shaped member 76. The sleeve shaft 52 is rotatably supported near its forward end in the casing 46 by a bearing 84 mounted in a wall 86 of casing 46 and is provided with teeth at its rear end forming the sun gear 66.

The second transmission shaft 50 is spaced laterally from and parallel to the shaft 30 and is rotatably supported in the casing 46 by bearings 88 and 90. A forward extension 92 of the shaft 50 is key connected to the universal joint 38 and is thus drivingly connected to the front pair of road wheels 10,10 by way of the propeller shaft 14, universal joint 40 and front differential 18.

The drive transfer means between the second shaft 50 and third shaft 52 are provided by the pair of meshing toothed elements or gears 54 and 56, the gear 54 being secured to and coaxial with the sleeve shaft 52 and the gear 56 being secured to and coaxial with shaft 50.

The friction clutch 58 comprises a set of mutually interleaved friction plates 94 and 96 respectively associated with the cylindrical portion 74 of the cup-shaped member 76 and the sleeve shaft 52. The friction plates 94 are carried in axial slots formed in the inner surface of the cylindrical portion 74, the slots being continuations of slots in the portion 74 defining the teeth of the ring gear 68. The plates 94 have their outer peripheral edges provided with radial tongues for cooperation with the slots in cylindrical portion 74 so that the plates rotate with the cup-shaped member 76 and are freely axially movable relative thereto. The friction plates 96 have their inner peripheral edges provided with radial tongues received within axial slots formed in the outer surface of the sleeve shaft 52 so that the plates 96 rotate with the sleeve shaft 52 and are freely axially movable relative thereto. The friction plates 94 and 96 are disposed between annular back and pressure plates 98 and 100, the plates having radial tongues in their inner peripheries for reception in axial slots in the sleeve shaft 52. The pressure plate is hydraulically operated to move axially of the shaft 52 to press the friction plates 94 and 96 together by the back and pressure plates 98 and 100 to drivingly connect the ring gear 68 and sun gear 66 and thereby to retard relative rotation of the transmission shafts 30, 52 and 53 by biasing torque between shaft 52 and cup-shaped member 76. For this purpose, the pressure plate 100 forms a portion of a servomotor as it is in the shape of a piston receivable within an annular fluid chamber 101 formed in the gear 54. The gear 54 is provided with a fluid passage 102 connected to an axially extending passage 104 in the sleeve shaft 52, the shaft 52 having an annular groove 106 communicating with a connected radial and axial passage 108 in shaft 30. The passage 108 is connected to a radial passage 109 adapted to be placed in communication with another radial passage 110 by the rotary valve 64, the passage 110 connecting to another axial passage 114 connected to a suitable pressure fluid source (not shown). To control the flow of pressure fluid to the clutch 58, the valve 64

(FIGS. 2 and 4) is provided in the shaft 30 and comprises an annular control member 116 rotatable on shaft 30 and having spaced ports 118 in its inner cylindrical surface and adapted to bridge the radially outer ends of the passages 109 and 110 in shaft 30, upon rotation of the member 116 to align the ports 118 and passages 109 and 110 to direct pressure fluid from passage 114 to passage 108, groove 106 and passage 104, and the chamber 101 in gear 54 to engage the clutch. The annular member 116 is normally positioned on shaft 30 to prevent flow of pressure fluid to the clutch 58 and, for this purpose, an annular plate or disc 120 is positioned on the shaft 30 and engaging one side of the valve member 116, the inner periphery of the plate being provided with a collar formed with a laterally extending tongue 122 extending between splines in the shaft 30 to prevent relative rotation of the disc 120 and shaft 30. The disc 120 is provided with a plurality of openings receiving springs 124, the springs 124 being received within pockets in the side of the valve member 116 and normally positioning the valve member as shown in FIGS. 2 and 4 to disconnect its ports 118 from passages 109 and 110 in shaft 30. When the valve member is forcibly rotated on the shaft 30, the springs can compress sufficiently to permit alignment of ports 118 and passages 109 and 110 but, upon the removal of the force, the springs expand to again position the valve member 116 as shown.

Control mechanism for the valve 64 and thereby clutch 58 comprises the one-way clutches 60 and 62 operating in response to predetermined speed ratios of the input shaft 30 and the sleeve shaft 52 which correspond to speed ratios between output shafts 50 and 53.

More particularly, the casing is provided with spaced walls 128 and 130 having openings receiving a rod 132 for supporting the rod. A wheel 134 is rotatable on the rod 132, the rod 132 and valve member 116 each having an annular groove receiving a coil spring belt 136 for drivingly coupling the rotating valve member 116 to the wheel 134. The wheel 134 is formed with a lateral sleeve extending through wheels 140 and 142 and comprising portions of the conventional one-way clutches 60 and 62, a plurality of rollers 144 and 146 being interposed between and drivingly engaging the wedging surfaces of the sleeve and wheels 140 and 142. The wheels 140 and 142 are rotated by coil spring belts 148 and 149 respectively positioned in grooves in the wheels 140 and 142 and grooves in the stepped surface of the shaft 52 so that the wheels are rotated by the shaft 52. The wheel 140 is larger than the wheel 142 and these wheels are related to the driving wheel 134 that the wheel 140 rotates .88 slower and the wheel 142 rotates 1.02 faster than the wheel 134. The clutch 60 is oriented so that the wheel 140 may freely overrun the sleeve shaft 52 and its sun gear 66 when the shaft 52 and sun gear 66 are rotated faster than the wheel 134 by the shaft 30, the clutch rollers engaging when the shaft 52 rotates the wheel 140 slower than the shaft 30 to couple wheels 134 and 140 for conjoint rotation to create drag on the valve member 116 to move it to connect ports 118 and passages 109 and 110 to pressurize the clutch 58. The organization and arrangement of the one-way clutch 62 is such that it will slip or permit free relative rotation of the wheel 142 and shaft 52 as long as the shaft 30 and wheel 134 rotate faster than the wheel 142 and shaft 52; however, if the shaft 52 rotates faster than the shaft 30, the clutch 62 will engage and couple the wheel 142 and wheel 134 to cause belt 136 to rotate the valve member 116 to connect ports 118 and passages 109 and 110 to direct pressure fluid to the clutch 58.

The operation of the four wheel drive arrangement can best be explained by initially considering the normal relative speeds of rotation for the various components. During level, straight travel, assuming the front and rear wheels have equal radii and assuming the gear ratios of the front and rear differentials 18 and 20 are the same, wheel 140 rotates slower than wheel 134 because of the size differences. In the event one or both of the front road wheels lose traction and tend to spin freely, the shaft 50 will rotate the gears 56 and 54 to cause the shaft 52 and wheel 140 to rotate faster than the wheel 134 to engage the one-way clutch 60 thereby rotating wheel 134 faster than shaft 30 to provide phase rotation between the valve member 116 and shaft 30 so that the valve member 134 rotates relative to shaft 30 to direct fluid under pressure to the hydraulic clutch 58, which action thus restricts overspeeding over a predetermined amount of shaft 52 relative to shaft 30. Conversely, in the event one or both of the rear road wheels lose traction and spin freely, the output shaft 53 and ring gear 74 will increase speed causing output shaft 52 to rotate slower than the input shaft 30 because of the different sizes of wheels 140 and 142, wheel 142 slowing down until it equals the speed of wheel 134 and thereafter tends to become slower than wheel 134 to cause relative phase rotation between the valve member 116 and input shaft 30 to position the valve member 116 to connect its ports 118 to passages 110 and 109 to supply pressure fluid to the servomotor of clutch 58 to engage the clutch to restrict overspeeding of the rear road wheels over a predetermined amount.

DESCRIPTION OF MODIFIED EMBODIMENT OF FIGS. 5 AND 6

FIGS. 5 and 6 illustrate another control system for the center differential shown in FIG. 2 including the hydraulically operated friction clutch control of the planetary gear set and related input and output shafts. Since the control system of FIGS. 5 and 6 is adapted for the center differential of FIG. 2, it is believed a description of the control system only will be satisfactory. Portions of the differential in FIG. 5, similar to that of FIG. 2, are identified by the same numerals but having the suffix a.

The control system of FIGS. 5 and 6 comprises a pair of rods 500 and 502, the rod 500 being rotatably mounted in a bearing assembly 504 and one end of an arcuate actuator 506 (FIG. 6) and the rod 502 being rotatably supported by a bearing assembly 508 and the other end of the actuator 506, the bearing assemblies 504 and 508 having their outer races fixed in and to arcuate recesses (not shown) in the annular rib 510 of the casing 46a so as to permit limited rotary movements of the bearing assemblies and the rods relative to the casing for the purpose of actuating or displacing valve 532 in its housing 526.

Wheels 512, 514 and 516 are positioned on the rods 500 and 502, the wheels 512 being fixed to the shafts 500 and 502 and engaging the outer surface of a cylindrical collar 518 secured to the input shaft 30a to provide a friction drive to rotate the wheels 512. A one-way clutch 520 is provided to mount the wheel 514 on the shaft 500 and to permit rotation of the wheel, by its friction drive connection to shaft 52a, in one direction and to couple the wheel to the shaft 500 during counter rotation of the shaft 52a in an opposite direction, similar to the action of one-way clutch 144 in the control shown in FIG. 2. A second one-way clutch 522 is provided between the wheel 516 and shaft 502 to permit rotation of the wheel 516 upon rotation of the shaft 52a in one direction and to prevent rotation of the wheel 516 upon rotation of shaft 52a in an opposite direction, the one-way clutch 522 functioning similarly to the one-way clutch 146 in the control system shown in FIG. 2.

A valve 524 controls fluid under pressure, supplied from a suitable source (not shown), to the hydraulic clutch to engage the clutch for the same purpose described with reference to the control of FIG. 2. More particularly, the valve 524 comprises a valve body 526 having a passage 527 connected to the pressure fluid source and to two branch passages 528 and 530 communicating with a passage 534 having a movable valve member 532 reciprocal therein to connect the passage 534 with either the passage 528 or 530 dependent on the direction of movement of the valve member, the passage 534 providing fluid under pressure to passages 108a in shaft 30a and passages 104a and 102a in shaft 52a and to the clutch 58 to engage the clutch. The valve member 532 is connected to the actuator 506 by a link 536 so that, upon limited rotation of the actuator about the shaft 30a, the link will move the valve member up or down dependent on the direction of rotation of the actuator 506.

The operation of the one-way clutches 520 and 522 will now be described.

Since the wheel 514 is larger than the wheel 512, and the wheel 514 and 516 are related to and engage the stepped diametrical friction-engaging surfaces of the shaft 52a, the wheel 514 rotates .88 slower and the wheel 516 rotates 1.02 faster than the wheel 518. The one-way clutch 520 is oriented so that the wheel 514 may freely overrun the shaft 52a when the shaft 52a is rotated faster than the wheel 512 by the shaft 30a, the clutch rollers engaging when the shaft 52a rotates the wheel 512 slower than the shaft 30a to couple wheels 512 and 514 for unitary rotation to create a drag on the actuator 506 coupled to shafts 500 and 502 to move the valve member to connect one of the passages 528 or 530 to the passage 534 to provide fluid under pressure to the friction clutch to engage this clutch. Also, the one-way clutch 522 is operative to permit free relative rotation of the wheel 516 and shaft 52a whenever the shaft 30a and wheel 512 rotate faster than the wheel 516 and shaft 52a; however, if the shaft 52a rotates faster than the shaft 30a, the clutch 520 will engage and couple the wheel 514 to the wheel 516 and wheel 512 to provide a reaction effective to move the valve member to connect one of the passages 528 or 530 to the passage 534 to pressurize the friction clutch to engage the same.

The operation of the control system of FIGS. 5 and 6 is similar to the control system of FIGS. 2, 3 and 4, as should one or both of the front road wheels lose traction and tend to spin freely, and referring now to FIG. 2, the shaft 92 will rotate the gears 56 and 54 to cause shaft 52 and wheel 514 (FIG. 5) to rotate faster than wheel 512 to engage one-way clutch 520 and rotate wheel 512 faster than shaft 30a to rotate the actuator 506 to open valve 524 to engage the friction clutch to restrict overspeeding of shaft 52a relative to shaft 30a. On the other hand, should one or both of the rear road wheels lose traction to spin freely, the output shaft 53 will increase speed to cause output shaft 52a to rotate slower than input shaft 30a due to the different sizes of wheels 514 and 516, wheel 516 slowing down until it equals the speed of the wheel 512, and thereafter rotating slower than wheel 512 to cause rotation of the actuator 506 and thereby movement of valve member 532 to open the valve 524 to engage the friction clutch and to restrict overspeeding of the rear road wheels.

It will be apparent that, as in the control system of FIG. 2, the control system of FIGS. 5 and 6 is effective to provide control means sensing speed ratio between two of the shafts for activating the clutch in response to said speed ratio being in excess of a predetermined value to bias torque between two of said shafts, the control means including the one-way clutches 520 and 522, and valve 524.

DESCRIPTION OF MODIFIED EMBODIMENT OF FIG. 7

FIG. 7 illustrates another control system for the center differential shown in FIG. 2 including the planetary gear set, and the pressure-fluid operated friction clutch controlling the gear set and the input and output shafts. Considering the control system of FIG. 7, components of the center differential and controls therefor common to those of FIGS. 2, 3 and 4 bear similar numerals but having appended thereto the suffix b.

The control system of FIG. 7 functions in a manner and for the same purpose as that of FIGS. 2 and 5. However, the control system differs in structure as will now be described.

More particularly, the control system of FIG. 7 comprises rods 702 and 704 diametrically spaced in relation to the axis of the input shaft 30b and rotatably supported by bearing assemblies 706 and 708 fixedly mounted in an annular rib 710 of the casing. Wheels 712 and 714 are fixed to respective rods 702 and 704 and engage the outer surface of the annular control member 116b of the valve 64b to be frictionally driven by the control member due to its connection to the input shaft 30b by the coil spring 124b and disc 120b, the valve control member 116b having limited rotational movement relative to shaft 30b to align its ports 118b with the passages 110b and 109b to direct fluid under pressure from passage 114b of shaft 30b to the passage 108b, groove 106b and passages 104b of shaft 52b to the servomotor operating the friction clutch.

A one-way clutch 716 is provided to connect a wheel 718 to the rod 702, and a second one-way clutch 720 connects a wheel 722 to the rod 704. The wheels 718 and 722 engage and are normally rotatable by the stepped diametrical friction-engaging surfaces of the shaft 52b. The one-way clutch 716 permits rotation of the wheel 718 in one direction of rotation of shaft 52b but couples the wheel 718 to the shaft in the event the shaft 52b overruns the wheel 718. One-way clutch 720 also permits rotation of wheel 722 in the direction of rotation of shaft 52b but couples the wheel 722 to the shaft when the shaft 52b rotates slower than the wheel 722. Whenever either the one-way clutch 716 or 720 operate to lock the associated wheel to its shaft, rotation of the wheels 714 will be retarded to cause the valve control member 116b to rotate to one or the other of its positions to direct fluid under pressure to the friction clutch to engage the clutch.

The operation of the control system of FIG. 7 is similar to the control system of FIGS. 2, 3 and 4, since, should one or both of the front road wheels spin freely, the shaft 92, and, referring to FIG. 2, will rotate the gears 54 and 56 to cause the shaft 52 and wheel 718 (FIG. 7) to rotate faster than wheel 712 to engage one-way clutch 716 and rotate wheel 512 faster than shaft 30b to cause the wheel 712 to rotate the valve member 116b to pressurize and engage the friction clutch to restrict overspeeding of shaft 52b relative to shaft 30b. In the event should one or both rear road wheels spin freely, the output shaft 53 (FIG. 2) will increase its speed to cause output shaft 52b to rotate slower than input shaft 30b due to the different sizes of wheels 718 and 722, wheel 722 slowing down until it equals the speed of the wheel 714, and then rotating slower than wheel 714 to cause the wheel 714 and the valve member 116b to rotate to open valve 64b to engage the friction clutch and thereby restrict overspeeding of the rear road wheels.

DESCRIPTION OF THE MODIFIED EMBODIMENT OF FIG. 8

FIG. 8 illustrates another control system for a center differential similar to FIG. 2 and including the planetary gear set, and hydraulic friction clutch control of the gear set and related input and output shafts. As these components of this differential have been previously described, such components will be identified by similar numerals used in FIG. 2, but bearing the suffix c.

The control system of FIG. 8 comprises a pressure fluid-generating device 802 in the form of a positive displacement bi-directional pump of the conventional gerator type having (FIG. 9) an inner rotor 804 keyed to the input shaft 30c, and an outer rotor 806 rotatable in a housing. The housing comprises a cylindrical end portion 808 surrounding the rotors, and side plates 810 and 812. The outer rotor 806 is provided with recesses 814 therein adapted to receive the teeth 816 on the inner rotor 804. As seen in FIG. 9, rotation of the rotors in a clockwise direction causes fluid to enter the pump through the port 818 in the housing plate 810 and, in a well-known manner, will act in the fluid chambers between the teeth 816 of the inner rotor and the recesses 814 of the outer rotor to provide fluid under pressure to a port 820 in the housing plate 812. Upon rotation of the rotors in a counterclockwise direction, the rotors are effective to cause fluid to enter the pump through port 820 and to provide fluid under pressure to port 818.

When the input shaft 30c and the output shaft 52c rotate under normal front and rear wheel traction, the rotors 804 and 806 will be rotated substantially unitarily and the pump will be effective to provide fluid under pressure to the ports 818 or 820. However, in the event either the front or rear wheels should lose traction and slip, the shaft 52c will rotate relative to the input shaft 30c to cause relative rotation of the pump elements to provide fluid under pressure to passages 104c and 821, by way of control valve 822 to the servomotor of the clutch 58c to cause its pressure plate piston 824 to engage the clutch plate 94c and 96c to bias torque between the ring and sun gears 68c and 66c of the planetary center differential.

The control valve 822 comprises a movable valve element or spool 826 and a coil spring 828 located in a radially extending bore 829 in the servomotor housing 830, a plug closing the outer end of the bore. The housing 830 is also provided with a port or orifice 832 connecting the valve bore 829 with the housing chamber 833, containing the piston 824, and the passage 821 connected to the pump. A vent port 834 is also provided in the housing 830 for flow of pressure fluid from the bore 829 in the housing to the oil sump of the differential casing 46c, when the valve spool is operative to connect the port 832 with the vent 834. The valve spool 826 is provided with end lands connected by a conical portion defining a groove communicating with the orifice 832, the radially outer land closing the vent port 834.

In operation, the valve spool is movable, by centrifugal force, in a direction radially outward of the axis of shaft 52c and, by so doing, causes the valve orifice 832 to provide a certain hydraulic resistance against which the pump creates pressure by forcing fluid to flow through the resistance 832 and this pressure is effective to energize the clutch pressure plate piston to engage the clutch to restrict slippage or overspeeding of the front road wheels.

The valve 822 is used to minimize the effect of the vehicle's speed on the relation between the speed ratio of front vs. rear wheels to the biased torque between these two sets of wheels. Without the valve 822, the biased torque between the front and rear sets of wheels will depend on the algebraic difference of speed of these two sets of wheels; however, by adding this valve, the biased torque can be made to depend on their speed ratio. In this respect, it may be noted, by way of example, if the input shaft 30c rotates at 10 M.P.H., the front differential shaft 52c will rotate at 11 M.P.H. and the rear differential shaft 53c will rotate at 9.5 M.P.H. The difference in rotation of the pump element will be 1 M.P.H. In such case, the valve 822 operates to cause the valve orifice to have 10 times the resistance, compared with a case where the input shaft rotates at 100 M.P.H., the front shaft 52c rotates at 110 M.P.H., and the rear shaft rotates at 95 M.P.H. In either case, the pressure generated by the pump will be the same, although the fluid flow of the latter example will be one-tenth compared to the first example.

DESCRIPTION OF THE EMBODIMENT OF THE INVENTION OF FIGS. 10 AND 11

The center differential and its control system illustrated in FIG. 10 is designed for use in a multiple driving axle vehicle, such as a four wheel drive automotive vehicle shown in FIG. 11. More particularly, the drive arrangement of the vehicle of FIG. 11 comprises a frame 900 supporting an engine 901 connected to a suitable transmission 902 through a clutch assembly 903 in conventional manner. The transmission 902 is coupled to a connecting shaft 904 by a universal coupling 905, the shaft 904 being connected by a universal coupling 906 to a shaft 907 in a casing 908. The casing 908 contains transfer gear mechanism 909 connecting the shaft 907 to an input gear 910 (FIG. 11) of the center differential 911 and its control mechanisms 912 and 913 housed in the casing 914. The center differential 911 has an output shaft 915 having one end coupled to a shaft 916 by a universal coupling 917, the opposite end of the shaft 916 being connected by a universal coupling 918 to the rear differential 919 driving the rear road wheels 920 of the vehicle. The center differential has also an output shaft 921 connected by a universal coupling 922 to one end of a shaft 923, the other end of shaft 923 being connected, by a universal joint 924, to the front differential 925 connected to the front wheels 926.

Referring now to FIG. 10, the output shaft 921 is rotatably mounted in a bearing 927 in the front wall 928 of casing 914 and the output shaft 915 is rotatable in a bearing 929 in the rear wall 930 of the casing 914. The inner ends of aligned shafts 921 and 915 are adjacent each other and have splined thereto bevel gears 931 and 932 meshing with a plurality of bevel gears 933 rotatably mounted on a differential cross 934 having its free end portions extending into apertures in a rotatable differential housing 935. The housing 935 has a circular shoulder 936 for mounting the annular spur gear 910 secured thereto by bolts 937 so that, upon rotation of the gear 910, drive will be transmitted from the input gear 910 to the housing 935 and thereby to the cross 934 and bevel gears 933 to rotate the gear 931 and output shaft 921 to the front differential and wheels, and also to rotate gear 932 and output shaft 915 to the rear differential and wheels.

The control mechanism 912 comprises a hydraulically operated friction clutch adapted to bias torque between the input gear 910 to the output shaft 921. More particularly, the clutch 912 comprises a clutch housing 936 having a backing plate 938 with an annular portion 939 surrounding the output shaft 921 and rotatably supporting the housing on a bearing 940 mounted on the wall 928 of the casing 914, the outer periphery of the plate 938 having splines intermeshed with splines 942 on the cylindrical portion 943 of the clutch housing, which is welded as at 944 to the annular periphery 945 of the housing. A plurality of friction discs 946 are supported by the splines 942 for rotation with and movement axially of the cylinder 943. A plurality of friction discs 947 are also nonrotatably secured to the annular portion 948 of the clutch by means of splines 949 and are interleaved between the friction discs 946. Both the friction discs 946 and 947 are axially movable relative to the clutch housing to activate the clutch.

The hydraulic clutch servomotor used to engage the clutch discs 946 and 947 comprises a clutch cylinder 950, and pressure plate piston 985 mounted within and reciprocal in the cylinder 950. The clutch cylinder is provided by body portion 951 having an axially extending annular flange 952 and the annular periphery 945 of the clutch housing 936, the cylinder 950 forming an integral portion of the housing 935. The annular piston 985 has its outer periphery provided with splines interconnected with splines 942 on the cylindrical portion 943 of the clutch housing so the piston 985 will rotate with the housing and can move axially to engage the friction discs 946 and 947. The cylinder 950 is provided with fluid under pressure to actuate the piston 951 by means of a passage 953 extending through the clutch body portion 951 and the housing 935 to an annular groove 954 in the housing and passages 955 and 956 in the output shaft 915. The axial passage 956 in shaft 915 is connected to a radial passage 957 adapted to be connected by and through a valve 958 to a radial passage 959 in shaft 915, an axial passage 960 in shaft 915 connecting the passage 959 to a radial passage 961 in shaft 915 communicating with a groove 962 and passage 963 in the differential housing 914, the passage 963 being connected to and conducting pressure fluid from a suitable source.

The valve 958 is similar to the valve 64 shown and described with reference to FIGS. 2, 3 and 4 and accordingly, like numbers will be used with the suffix *d* added. The valve comprises an annular control member 116d rotatable about the shaft 915 within predetermined limits as permitted by the coil springs 124d and plate 120d, the plate 120d being keyed to the shaft 915 to cause the valve member to normally rotate with the shaft. The valve member 116d has spaced passages 118d alignable with and bridgeable over the passages 957 and 959 to provide for flow of fluid under pressure from passage 957 to passage 959 and to the clutch servomotor.

The rotative movement of the valve member 116d relative to shaft 915 is automatically controlled by the control mechanism 913, similar to the one-way control mechanism shown in FIG. 2, in that the control means senses speed ratio between two of the shafts to activate the clutch in response to said speed ratio being in excess of a predetermined value. The control mechanism 913 includes a wheel 964 keyed to a rod 965 rotatably supported at opposite ends in the spaced walls 986 and 930 of the differential casing 914, one end of the rod being mounted in the wall 930 and urged to eccentric rotation of the adjacent portion of the rod by a spring wire 980 to provide frictional engagement of the wheels 964, 966 and 967 to their respective shaft lands and to valve 958. The wheel 964 has its outer periphery frictionally engaging the cylindrical outer surface of the valve member 116d to rotate the same on shaft 915 to position its passage 118d in bridging relation to the passages 957 and 959 of shaft 915. A pair of wheels 966 and 967 is positioned on the rod 965, and conventional one-way clutches 968 and 969 respectively connect the wheels to the rod for free-wheeling of the wheels on the rod, or clutching engagement with the rod in response to speed differences of the input gear 910 and output shafts 921 and 915. The wheels 964, 966 and 967 are of different diameters, the wheel 967 being larger than the wheels 964 and 966 and the wheel 964 being larger than the wheel 966. The wheels 966 the 967 frictionally engage the stepped surfaces of the end portion 970 of the rotatable housing 935, which is mounted on a bearing 971 of the wall 966 of the casing 914. The one-way clutches 968 and 969 are structurally similar to and function like the one-way clutches shown in FIG. 2. The clutches comprise a plurality of rollers interposed between and drivingly engaging the wedging surfaces of the rod 965 and wheels 966 and 967. The clutch 968 is oriented so that the wheel 966 may freely overrun the sleeve portion 981 of the wheel 964 when the input gear 910 is rotated faster than the shaft 915. The clutch rollers engage when the shaft 915 rotates slower than the input gear 910 to create a drag on the valve member 116d to rotate it to connect ports 118d with passages 957 and 959 to pressurize the clutch 912. The organization and arrangement of the one-way clutch 969 is that it free wheels as long as the driving input gear 910 rotates slower than shaft 915; however, if the shaft 915 rotates faster than the shaft input gear 910, the clutch will engage and couple the wheel 967 and wheel 964 to cause the wheel 964 to rotate valve member 116d relative to shaft 915 to connect ports 118d and passages 957 and 959 to direct fluid under pressure to the clutch to activate the clutch.

In the operation of the four wheel drive arrangement, during level and straight travel of the vehicle, assuming the front and rear wheels to be of equal radius, they will have substantially the same angular speed and the front and rear differentials 929 and 919 will rotate at the same speed. In the control system, wheel 967 rotates slower than wheel 964 because of the size difference. In the event one or both of the rear wheels lose traction and tend to spin freely, the shaft 915 and valve member 116d will rotate the wheel 964 faster than the wheel 967 to engage the one-way clutch 969 thereby causing wheel 964 to rotate valve member 116d to direct pressure fluid to the friction clutch, activating the friction clutch. Conversely, if one or both of the front wheels spin freely, the shaft 921 will rotate at increased speed to rotate the gear 932 and shaft 915 at a slower speed causing the wheel 964 to rotate slower than the wheel 966 and thereby effect locking of the one-way clutch 968 to prevent rotation of rod 965 and wheel 964 to thereby rotate valve member 116d to provide fluid under pressure to activate the friction clutch.

Throughout the various descriptions of the different multiple driving axle vehicle embodiments of the invention, with the exception of FIG. 8, it will be assumed that all gears and one-way clutch wheels are rotating in a direction which corresponds to a forward motion of the vehicle, and that the pressure supply provided for energizing the biasing clutch is discontinued when the vehicle is put into reverse motion.

While the present invention has been described in considerable detail and many modifications have been shown and described, it should be apparent that other changes, modifications, and adaptations thereof may be made by those skilled in the art, and it is intended to hereby cover all changes, modifications, and adaptations thereof coming within the scope of the appended claims.

What is claimed is:

1. In an automotive differential having three power transmitting shafts, means for biasing torque between two of said shafts, and control means driven by at least two of said power transmitting shafts and associated with said biasing means for sensing speed ratio between said two of said shafts and for activating said biasing means in response to said speed ratio being in excess of a pre-determined value.

2. In an automotive differential as defined in claim 1 in which one of said shafts is an input shaft, and the other of said shafts are output shafts, and said control means includes means rotatable with said shaft and sensing the rotary speeds of the shafts and operative to energize said torque-biasing means upon sensing more than a predetermined speed difference between any two shafts.

3. In an automotive differential as defined in claim 1 wherein said torque-biasing means is a friction clutch.

4. In an automotive differential as defined in claim 1 wherein said torque-biasing means is a friction clutch, a hydraulic servomotor for operating said clutch, and a valve actuatable to supply pressure fluid to said servomotor, and said control means is operative to actuate said valve.

5. In an automotive differential as defined in claim 2 wherein said torque-biasing means includes a hydraulically operated friction clutch, a valve actuatable to supply pressure fluid to said clutch, and said control means senses the rotary speeds of the shafts and is operative, upon speed differences between the output shafts, to actuate the valve.

6. In an automotive differential as defined in claim 4 wherein said valve is connected to two of said shafts and is operable, upon relative rotation thereof, to an open position to direct pressure fluid to said friction clutch.

7. In an automotive differential as defined in claim 4 wherein said valve includes a fluid flow control member connected to said input shaft and rotatable relative thereto, by operation of said control means, to supply pressure fluid to said clutch.

8. In an automotive differential as defined in claim 4 in which one of said shafts is an input shaft, and the other of said shafts are output shafts, and wherein torque-transmitting means connect said input shaft to said output shafts, and said torque-biasing means includes a friction clutch; and wherein said control means is in spaced relation to said torque-transmitting means and is operative to actuate said clutch.

9. In an automotive differential as defined in claim 3 including differential gearing having components respectively connected to said three shafts for transmitting torque from said input shaft to said output shafts, and wherein said friction clutch includes engageable driving and driven members respectively connected to two of said components.

10. In an automotive differential as defined in claim 3, including a planetary gear set having a sun gear element, ring gear element, planetary carrier element respectively connected to said three shafts for transmitting torque between said shafts and wherein said friction clutch has engageable driving and driven members respectively connected to two of said elements.

11. In an automotive differential as defined in claim 4 in which said control means is operative to maintain said valve in closed position when said speed ratio is less than a predetermined value and to open said valve when said speed ratio exceeds said predetermined value.

12. In an automotive differential as defined in claim 1 wherein said control means includes a control shaft driven by one of said power-transmitting shafts, a control member rotatably supported on said control shaft and driven by a second of said power-transmitting shafts, one-way clutch means disposed between said control shaft and member allowing free relative rotation of said control shaft and member in one direction and coupling said control shaft and member when said control shaft and member rotate in a second direction to activate said torque-biasing means.

13. In an automotive differential as defined in claim 12 wherein said torque-biasing means includes a friction clutch, a hydraulic servomotor for operating said clutch, and a valve actuatable by said control means, upon coupling said control shaft and member, to an open position to supply pressure fluid to said clutch.

14. In an automotive differential as defined in claim 12 wherein said power-transmitting shafts include an input shaft and two output shafts, and torque-transmitting means connect said input shaft to said output shafts, and said one-way clutch means is in spaced relation to said torque-transmitting means and incapable of transmitting torque between said input and output shafts.

15. In an automotive differential as defined in claim 1 wherein said control means includes a first control shaft driven by a first shaft of said power-transmitting shafts, a first control member rotatably supported on said control shaft, a second control member rotatably supported on said control shaft, said control members being driven by a second control shaft driven by a second shaft of said power transmitting shafts, a first one-way clutch means disposed between said first control shaft and said first control member and operable to couple said first control shaft and first control member upon overspeeding of said second control shaft, in one direction, relative to said first power transmitting shaft, and second one-way clutch means disposed between said first control shaft and said second control member and operable to couple said first control shaft and said second control member upon overspeeding of said second control shaft, in a second opposite direction, relative to said first control shaft.

16. In an automotive differential as defined in claim 15 wherein said first power-transmitting shaft is an input shaft, and the other two of said power-transmitting shafts are output shafts, and a gear set connects said input shaft to said output shafts and to said second control shaft.

17. In an automotive differential as defined in claim 15 in which said torque-biasing means includes a friction clutch, a hydraulic servomotor for operating said clutch, and a valve controlling pressure fluid to said servomotor, and coupling operation of said first and second one-way clutch means of said control means activating said valve to direct pressure fluid to said servomotor.

18. In an automotive differential as defined in claim 16 in which said gear set includes relatively rotatable members respectively connected to said output shafts, and said torque-biasing means includes a friction clutch having engageable driving and driven members respectively connected to said gear set members to restrict overspeeding, ovdr a predetermined amount, of either of said output shafts relative to said input shaft.

19. In an automotive differential as defined in claim 16 in which said gear set includes relatively rotatable members respectively connected to said output shafts, and said torque-biasing means includes a friction clutch having engageable driving and driven members respectively connected to said gear set members to restrict overspeeding, over a predetermined amount, of either of said output shafts relative to said input shafts, an hydraulic servomotor for engaging said clutch members and a valve controlling pressure fluid to said servomotor and having a valve member operably connected to and actuatable by said first control shaft, in response to movement of said first control shaft by said first and second one-way clutch means.

20. In an automotive differential as defined in claim 1 wherein said torque-biasing means includes a friction clutch, and said control means includes a pressure fluid-generating device having components relatively rotatable to provide pressure fluid to activate said clutch.

21. In an automotive differential as defined in claim 1 wherein said torque-biasing means includes a friction clutch, a hydraulic servomotor for engaging said clutch, and said control means includes a positive displacement pump having pumping members respectively connected to said two shafts and relatively rotatable thereby to provide fluid under pressure to said servomotor.

22. In an automotive differential as defined in claim 21 wherein said three power-transmitting shafts include an input shaft and two output shafts, said torque-biasing means includes a valve controlling pressure fluid from said pump to said servomotor, said valve being responsive to vehicle speed in a manner to minimize the effect of the vehicle speed on the relation between the speed ratio of said output shafts to the biased torque between the output shafts.

* * * * *